(12) United States Patent
Hsia

(10) Patent No.: US 6,604,320 B1
(45) Date of Patent: Aug. 12, 2003

(54) SUPPORTS FOR BRANCHES AND VINES

(76) Inventor: Chih-Yu Hsia, 301 Warren Way, Arcadia, CA (US) 91007

( * ) Notice: Subject to any disclaimer, the term of this patent is extended or adjusted under 35 U.S.C. 154(b) by 0 days.

(21) Appl. No.: 10/073,577

(22) Filed: Apr. 10, 2002

(51) Int. Cl.[7] .......................... A01G 17/06; A01G 17/14
(52) U.S. Cl. ........................ 47/47; 47/44; 47/42; 47/70; 248/27.8; 248/127; 248/327; 211/119.12
(58) Field of Search .......................... 47/47, 4, 70, 40.5, 47/41.14, 42, 43, 44, 46; 211/119.12, 128, 191, 193, 190, 119.01; 248/27.8, 127, 158, 161, 163.1, 163.2, 432, 431, 188, 188.2, 188.7, 202.1, 327

(56) References Cited

U.S. PATENT DOCUMENTS

| 72,858 | A | * | 12/1867 | Ingalls | |
|---|---|---|---|---|---|
| 497,853 | A | * | 5/1893 | Wright | |
| 670,144 | A | * | 3/1901 | Bond | |
| 1,038,198 | A | * | 9/1912 | Randall et al. | |
| 1,080,758 | A | * | 12/1913 | Glascock | |
| 1,234,960 | A | * | 7/1917 | Talbert | |
| 1,285,500 | A | * | 11/1918 | Walters et al. | |
| 1,693,180 | A | * | 11/1928 | Phelp | |
| 2,862,334 | A | * | 12/1958 | Sandvig | |
| 3,204,779 | A | * | 9/1965 | Warner | |
| 4,074,461 | A | * | 2/1978 | Hirschman | 47/70 |
| 4,386,480 | A | * | 6/1983 | Horowitz | 47/45 |
| 5,752,341 | A | * | 5/1998 | Goldfarb | 47/78 |
| 6,155,529 | A | * | 12/2000 | Carlo | 248/523 |
| 6,282,836 | B1 | * | 9/2001 | Goode et al. | 47/43 |

FOREIGN PATENT DOCUMENTS

| CH | 662471 A5 | * | 5/1984 | A01G/9/12 |
|---|---|---|---|---|
| GB | 2179833 A | * | 3/1987 | A01G/17/04 |

* cited by examiner

Primary Examiner—Peter M Poon
Assistant Examiner—Andrea M. Valenti

(57) ABSTRACT

A support for branches and vines consisting of a base which has a hole, a stem which has many holes at different levels and facing in various directions, many rods which may have many holes, many branch support assemblies each of which consist of a string which has at least two hooks, and a holder which may have many holes; the stem penetrating through the hole of the base; the rods being able to penetrate the stem through its holes; one of the hook of a branch support assembly being able to hook on a hole of a rod; another hook of the branch support assembly being able to hook on the holes of the holder of the branch support assembly.

15 Claims, 6 Drawing Sheets

SUPPORTS FOR BRANCHES AND VINES

BACKGROUND OF THE INVENTION

1. Field of the Invention

This invention relates to devices that support branches that are overloaded with growing fruits. The invention also relates to devices that support vines.

2. Descriptions of the Prior Arts

No prior art related to the supports for branches and vines was found.

SUMMARY OF THE INVENTION

When neglected, often a branch collapses by the weights of its own growing fruits. One way to prevent the branch from collapsing is to limit the numbers or sizes of the fruits on a branch. To do this would reduce the productions of the fruit tree. Another way to treat an overloaded branch is to provide additional supports to the branch. Commonly this would be done with wood sticks fastened to the branch. The wood sticks support the branch from below. This kind of supports is rather cumbersome and also unpractical when many branches of the same fruit tree need additional supports at the same time. This kind of supports also limits the abilities of a branch to swing with winds.

One of the objectives of the current invention is to create a supporting device that is movable, easily assembled, and easily disassembled. The other objective of the invention is to create a supporting device that can support as many branches as desired and the branches can still swing with winds. Another objective of the invention is to create means to be used to support vines or the alike.

These and other objects and advantages of the invention, as well as the details of an illustrative embodiment, will be more fully understood from the following specification and drawings, in which:

DRAWING DESCRIPTION

GENERAL DESCRIPTION

Figure 1:
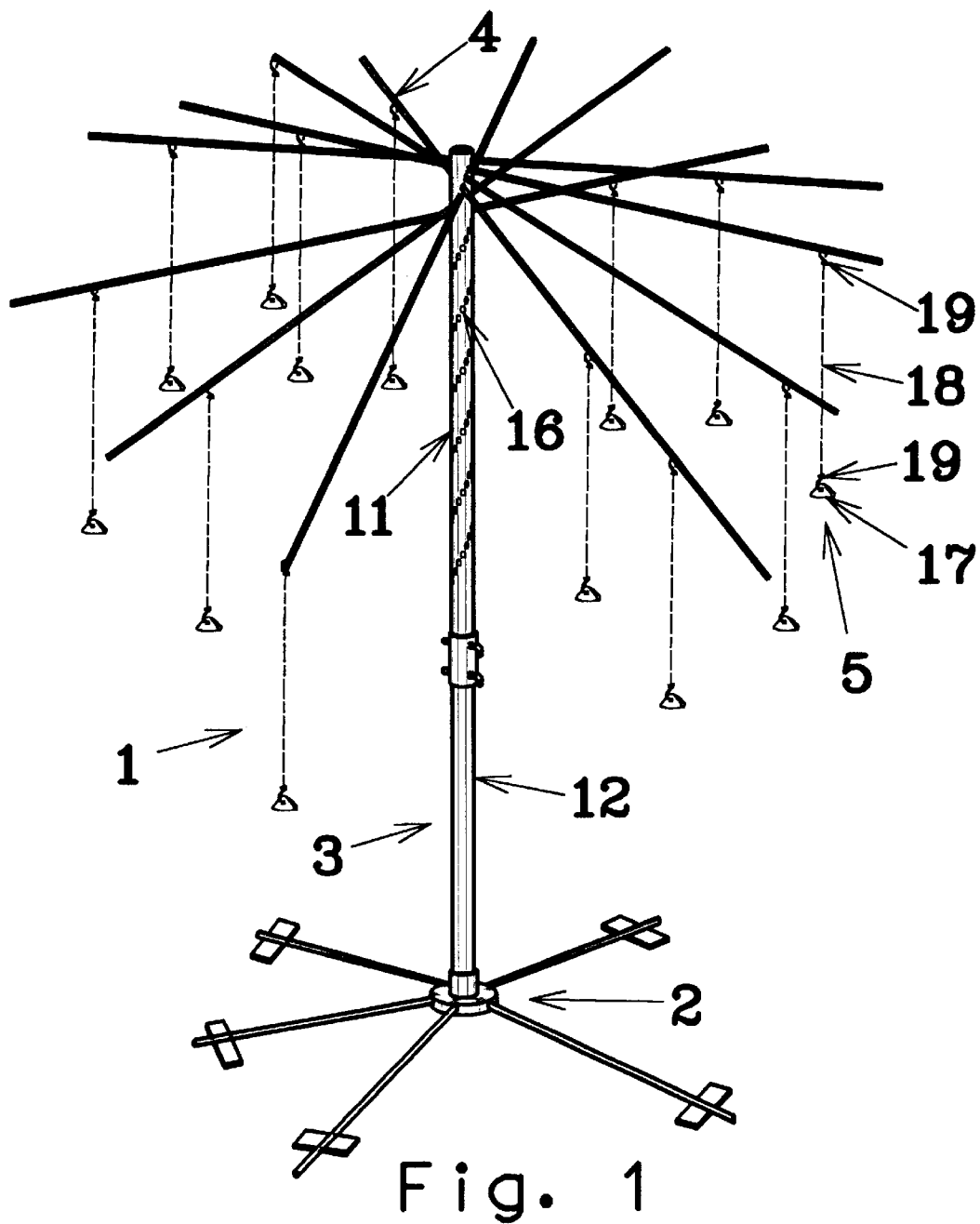
FIG. 1 is an isometric view of an invented support for branches.

Referring to FIG. 1, the invented supports for branches 1 consists of a base 2, a stem 3, many branching rods 4, and many branch support assembly 5. The invented supports for vines basically consists of the same components of these of the invented supports for branches except that the former does not need the branch support assembly 5.

Figure 3:
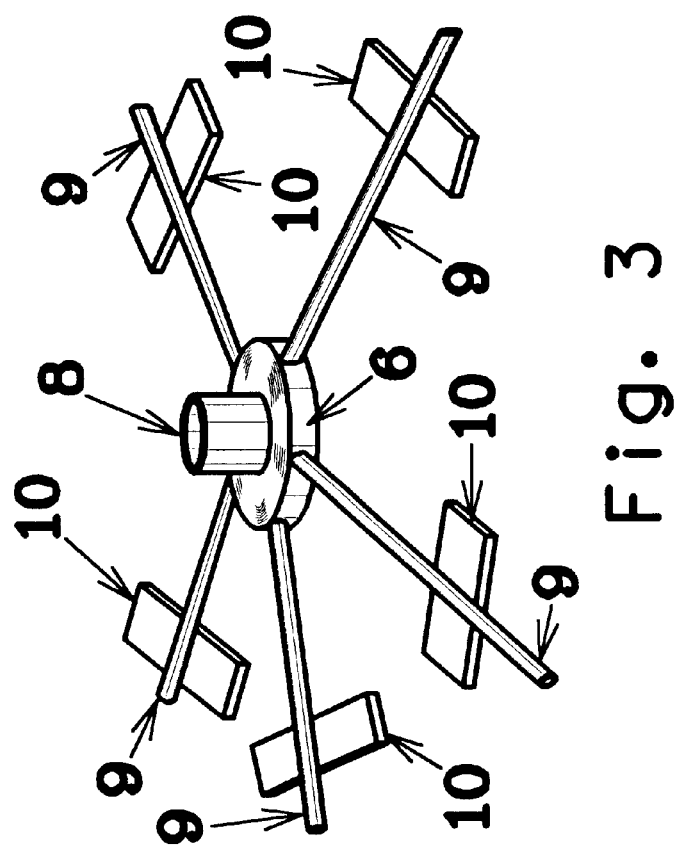
FIG. 3 is an isometric view of a base that consists of extension rods and a basic base shown in FIG. 2. Many supporting plates are also shown.
Figure 2:
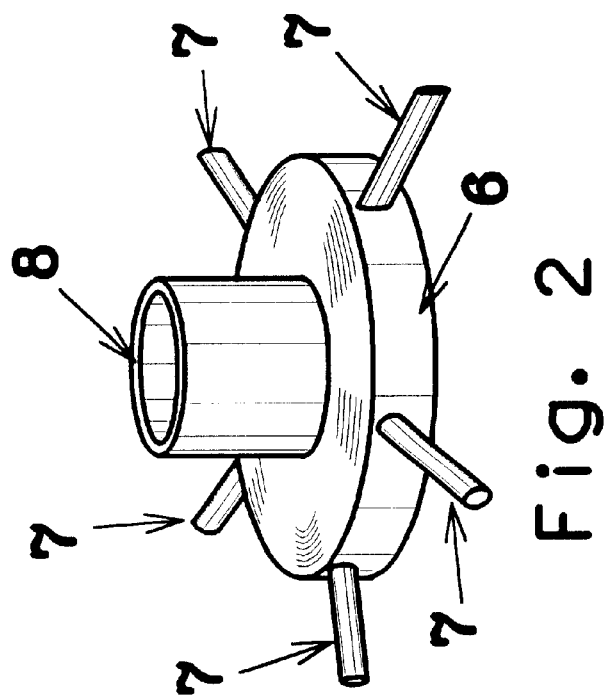
FIG. 2 is an isometric view of a basic base for the invented device.

Referring further to FIG. 2 and FIG. 3, the base consists of a basic base 6, many extension rods 9, and many optional supporting plates 10. The basic base is a thick plate with extruding rods 7 on the edge and a hole as well as an optional spool 8 in the center. The extension rod is a hollow rod which ends can engage with an extruding rod 7 to extend the footprint width of the basic base. The supporting plates are plates that expand the contact surfaces between the extension rod and the earth below.

Figure 4:
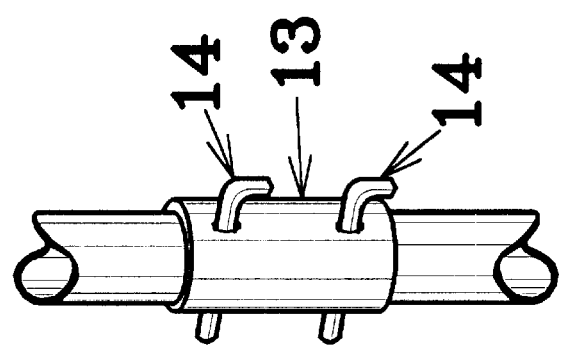
FIG. 4 is an isometric view that illustrates a mean to join two rods.

Referring back to FIG. 1, a stem 3 is a long rod which consists of a carrying rod 11 and an optional supporting rod 12. The carrying rod is a rod with penetrating holes 16 along the rod. The holes are spread along the rod in a way that not any two adjacent holes will be on the same plane or facing the same direction. As a result, the bottom of an upper penetrating hole is slightly higher than the top of a lower penetrating hole. A supporting rod is a rod with a penetrating hole at each end. The carrying rod or the supporting rod can penetrate the hole of the basic base and the spool of the basic base. Referring to FIG. 4, two carrying rods, two supporting rods, or one carrying rod and one supporting rod can be joined together by an extension spool 13 which is a spool which has penetrating holes at each of its end. A pin 14 can penetrates the holes on the extension spool and the hole at the end of a carrying rod or a supporting rod. The pin 14 secures the connection between two rods of a stem.

Figure 5:
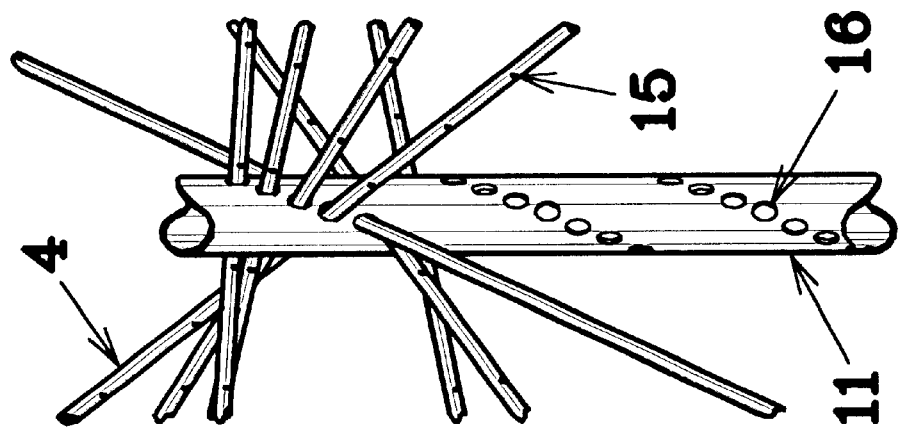
FIG. 5 is an isometric view which show a partial carrying rod and seven partial branching rods for the invented device.

Referring to FIG. 1 and FIG. 5, a branching rod 4 is a rod with optional holes 15 on it. The branching rods can penetrate through the holes 16 of the carrying rod 11.

Figure 6:
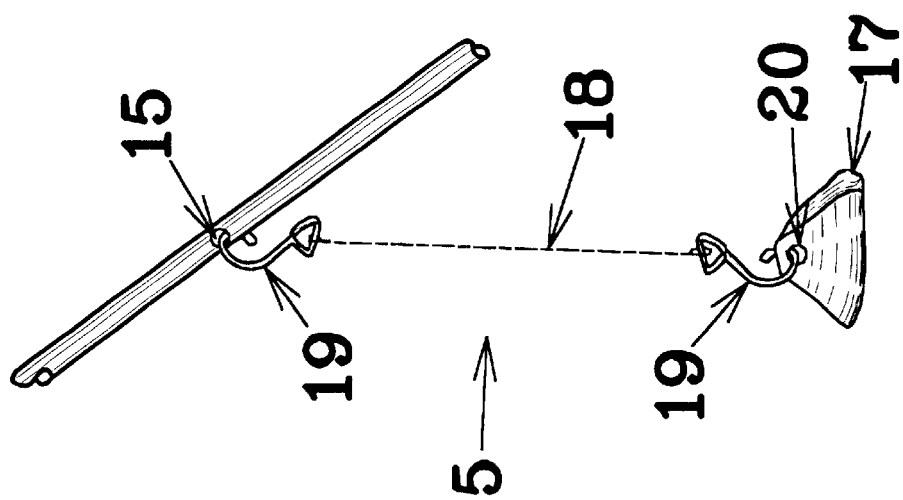
FIG. 6 is an isometric view which shows a partial branching rod and a branch support assembly.

Referring to FIG. 1 and FIG. 6, a branch support assembly 5 consists of a branch holder 17 and a holder string 18 which has two optional hooks 19. A holder string is a string, a rope, a chain or a wire. Hooks may be mounted on a holder string. The hook can hook on a hole 15 of a branching rod or the holes of a branch holder. The branch holder can be made of a piece of fabric, a piece of rubber, or a piece of plastic that has holes 20 on its edges. The branch holder can even be made of solid material such as wood or metal that also has holes or hook holes on its edges. When a holder string does not have the optional hooks, one end of the holder string is fastened to at least two holes/hook holes of two opposite edges of a branch holder. When the holder string has hooks, one hook of the holder string hooks up at least two holes/hook holes of two opposite edges of the branch holder.

Figure 8:
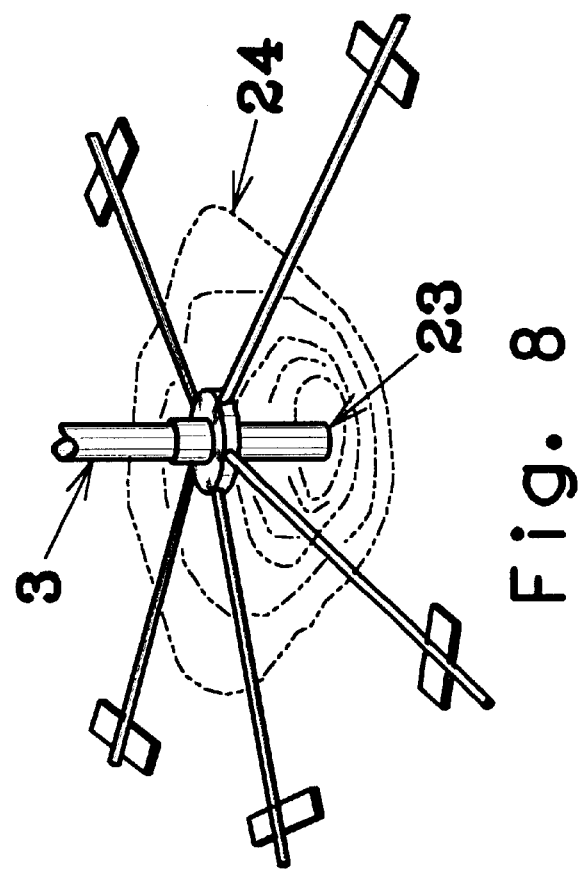
FIG. 8 is an isometric view of a partial supporting rod and a base shown in FIG. 3. The lower portion of the supporting rod penetrates through the base and sets in a depressed area depicted by dashed contour lines.
Figure 7:
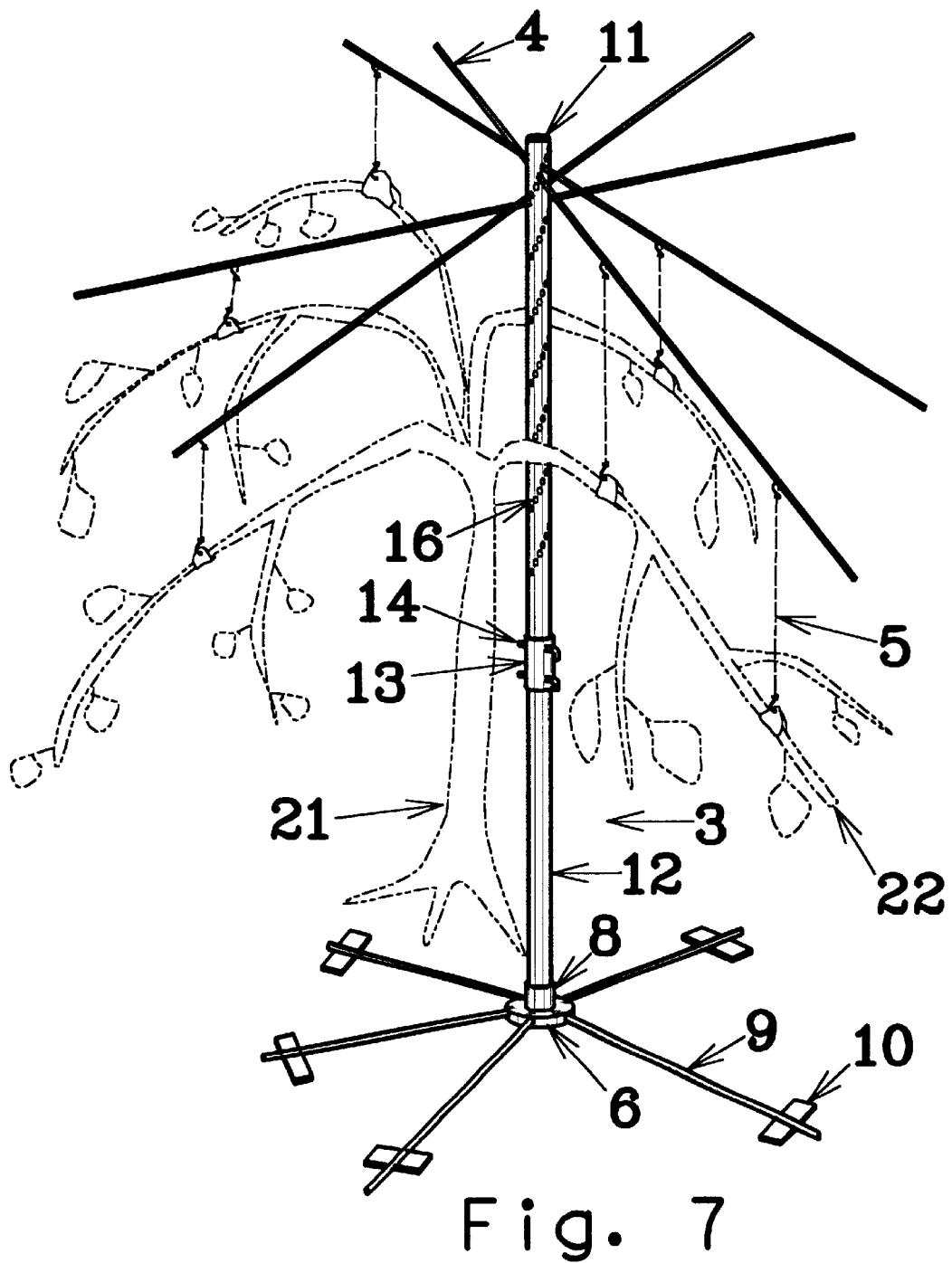
FIG. 7 is an isometric view which illustrates the use of the invented device to support branches of a overloaded fruit tree.

Referring to FIG. 7, in using an invented device, a user put a basic base next to a fruit tree 21 that has branches 22 overloaded with fruits. The user then pushes the extension rods 9 onto to the extruding rods of the basic base to make a base. The supporting plates 10 may be inserted underneath the extension rods at selected locations to make the plane depicted by the extension rods to be about level. The supporting plates can also increases the supports of the soils to the extension rods, especially when the soil is wet. The user then inserts a stem 3 through the spool 8. The stem consists of at least a single carrying rod and can consist of combinations of segments of supporting rods and carrying rods. The stem shown in FIG. 7 consists of two segments, a supporting rod 12 below and a carrying rod 16 above. An extension spool 13 and two pins 14 connect the two rods. Referring to FIG. 8, the stem may penetrate through the spool and reach the ground surface 23 when the stem is put on a depressed area 24. Because the ability the stem can penetrate the spool and the plane formed by the extension rods of the base is about level, the stem will be in an about vertical position and can take much vertical loads. Referring back to FIG. 7, the user then inserts a branching rod 4 through a hole 16 of the carrying rod 11. The hole will be so selected that the inserted branching rod will be above and about parallel to a branch that needs additional supports. Therefore, it is important to select a stem that has an adequate length such that the inserted branching rods are above the supported branches. A branching rod will be inserted for each of the branch that needs additional supports. Because the holes 16 face different directions along the carrying rod 11, practically a hole can be found to allow an inserted branching rod to point in any desired direction. Because no two holes occupy the same plane, no two inserted branching rods will interfere with each other. In this way, the user can select and insert as many branching rods as needed to support as many branches as desired. As a result, these branching rods are in different planes and may point in different directions.

The user then selects on a branch a location where additional support to the branch will be needed. The user selects the length of the holder string according to the distance between the selected location on the branch and the nearest branching rod. The user then puts the main body of a branch holder underneath the selected location on the branch and vertically extends at least two holes of the branch holder to above the branch, one at each side of the branch. If the holder string has hooks, the user then hooks one of its hooks through the holes of the branch holder from above the branch. The user then hooks another hook of the holder string to a hole of the branching rod. Then the branch support assembly 5, the branching rod 4 and the stem 3 carry a portion of the weight of the branch. The user can provide similar supports to other branches or other parts of the same branch. If the holder string does not have the hooks, the user just fastens one end of the holder string to the holes of the branch holder from above the branch. The user then fastens the other end of the holder string to the branching rod. Because of the flexibility of the holder string, the supported branches will still be able to move side ways with winds. Furthermore, when the winds lift up the branch, the branch will not lift up the branching rod because of the holder string will not transmit upward loads.

Although not illustrated, the base may be modified to have bracing between an extension rod and an elongated spool or a basic base to increase the strength of the base. Also, in lieu of the extruding rods, the basic base may have holes that can engage with extension rods to form a base.

Figure 9:
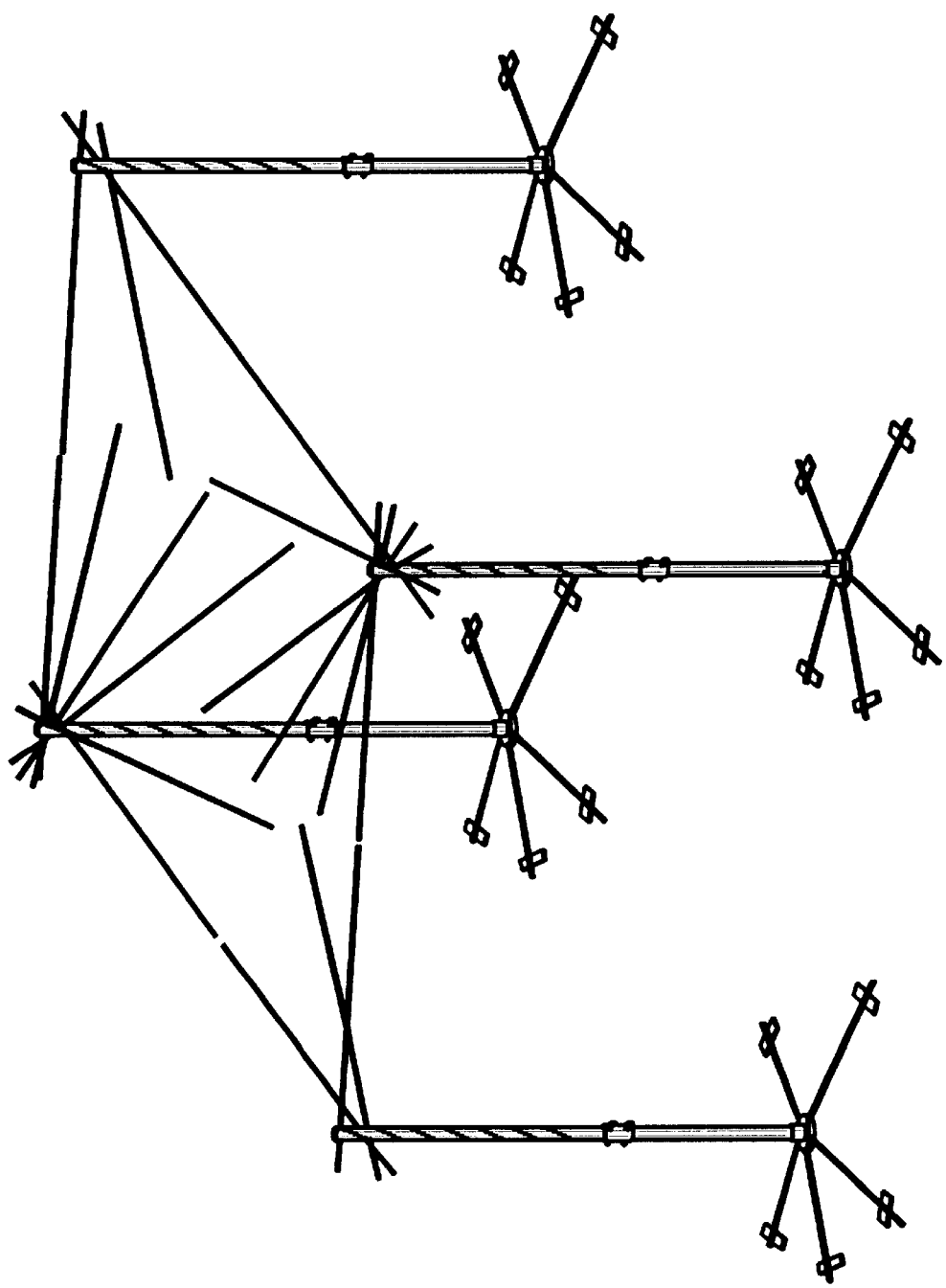
FIG. 9 is an isometric view which illustrates the use of the invented device to form a vine supporting structure.

The invented device may be used as supports for vines. Referring to FIG. 9 as an example, the uses of many of the invented devices together as well as properly selected and spaced branching rods can create a good supporting platform for vines or the alike. A single set of the invented device can also be used as an effective support for vines.

The entire embodiment of the invented device is easy to assemble. It can be easily and quickly disassembled for storage or relocations.

The foregoing is considered as illustrative only of the principles of the invention. Furthermore, since numerous modifications and changes will readily occur to those skilled in the art, it is not desired to limit the invention to the exact construction and operation shown and described, and accordingly all suitable modifications and equivalents, may be resorted to, falling within the scope of the invention as claimed.

I claim:
1. A support for branches consists of
  a) a base which has a hole which penetrates through said base;
  b) a stem;
  c) a rod in plural form;
  d) a branch support assembly in plural form;
  e) said branch support assembly consisting of a string and a branch holder which can wrap partially around a branch;
  f) said stem having a hole in plural form;
  g) no two adjacent said hole of said stem being on a same plane and facing a same direction;
  h) said stem penetrating said base through said hole of said base;
  i) said rod being able to penetrate said stem through said hole of said stem;
  j) one end of said string of said branch support assembly connecting with said rod;
  k) the other end of said string of said branch support assembly connecting with said branch holder of said branch support assembly.

2. The support for branches of claim 1 wherein said rod having a hole in plural form.

3. The support for branches of claim 1 wherein said string of said branch support assembly has at least a hook.

4. The support for branches of claim 3 wherein said hook of said string of said branch support assembly can hook on said hole of claim 2.

5. The support for branches of claim 1 wherein said branch holder of said branch support assembly has a hole in plural form.

6. The support for branches of claim 3 wherein said hook of said string of said branch support assembly can hook on said hole of claim 5.

7. The support for branches of claim 1 wherein said base has a spool connected to said hole of said base.

8. The support for branches of claim 1 wherein said base has an extruding rod in plural form and an extension rod in plural form; said extension rod engaging said extruding rod.

9. The support for branches of claim 8 wherein said extension rod being able to extend in length by joining another said extension rod by means of a spool and a pin in plural form; said spool being able to engage with said extension rod; said pin being able to penetrate said extension rod.

10. The support for branches of claim 8 wherein said base has bracing between said base and said extension rod.

11. The support for branches of claim 1 wherein said base has a recessed hole in plural form and an extension rod in plural form; said extension rod engaging said recessed hole.

12. The support for branches of claim 11 wherein said extension rod being able to extend in length by joining another said extension rod by means of a spool and a pin in plural form; said spool being able to engage with said extension rod; said pin being able to penetrate said extension rod.

13. The support for branches of claim 11 wherein said base has bracing between said base and said extension rod.

14. The support for branches of claim 1 wherein said stem consists of at least two segments; said segments connecting to each other by means of a spool and a pin in plural form; said pin penetrating said spool and said segments.

15. The support for branches of claim 14 wherein one of said at least two segments does not have said hole of said stem of claim 1.

* * * * *